United States Patent [19]

Estepp

[11] Patent Number: 5,169,588
[45] Date of Patent: Dec. 8, 1992

[54] SOLVENT BASED PLASTICS RECYCLING PROCESS

[76] Inventor: Gary N. Estepp, 1130 Willow Trail, Bosque Farms, N. Mex. 87068

[21] Appl. No.: 696,157

[22] Filed: May 6, 1991

[51] Int. Cl.⁵ .................. B29C 39/02; B29B 17/02
[52] U.S. Cl. ..................... 264/331.17; 209/930; 241/3; 241/21; 241/DIG. 38; 264/115; 264/122; 264/126; 264/347; 264/DIG. 69; 425/DIG. 46
[58] Field of Search ............... 264/37, 118, 109, 122, 264/236, 299, DIG. 69, 319, 347, 330, 333, 331.11, 331.17, 115, 126; 422/131; 241/21, 23, 19, 3, DIG. 38; 134/12, 17; 425/215, 217, DIG. 46; 209/930

[56] References Cited

U.S. PATENT DOCUMENTS

| | | | |
|---|---|---|---|
| 3,671,615 | 6/1972 | Price | 264/122 |
| 4,031,039 | 6/1977 | Mizumoto et al. | 422/131 |
| 4,067,826 | 1/1978 | Emery | 264/122 |
| 4,162,880 | 7/1979 | Cobbs, Jr. et al. | 264/DIG. 69 |
| 4,225,640 | 9/1980 | Erb | 264/122 |
| 4,596,603 | 6/1986 | Pellegrin et al. | 134/12 |
| 4,844,351 | 7/1989 | Holloway | 241/DIG. 38 |
| 4,968,463 | 11/1990 | Levasseur | 264/122 |
| 5,060,870 | 10/1991 | Trezek et al. | 241/DIG. 38 |

FOREIGN PATENT DOCUMENTS

| | | | |
|---|---|---|---|
| 50-36863 | 11/1975 | Japan | 264/DIG. 69 |
| 538931 | 8/1973 | Switzerland | 264/DIG. 69 |

Primary Examiner—Jeffery Thurlow
Assistant Examiner—Mathieu Vargot
Attorney, Agent, or Firm—William E. Hein

[57] ABSTRACT

A solvent based plastics recycling process directly reduces large volumes of post consumer plastic waste materials by up to 500% by volume. Minimal sorting and no cleaning is required, and large percentages of contaminants are tolerated. The process yields a highly adhesive resin which cures to a hard wood or masonry type material. The reduced end product, an epoxy sludge, may be formed to provide a lumber or brick substitute. Large percentages of shredded paper and other waste materials, including metals, may be added to the plastic waste materials, if desired.

15 Claims, 1 Drawing Sheet

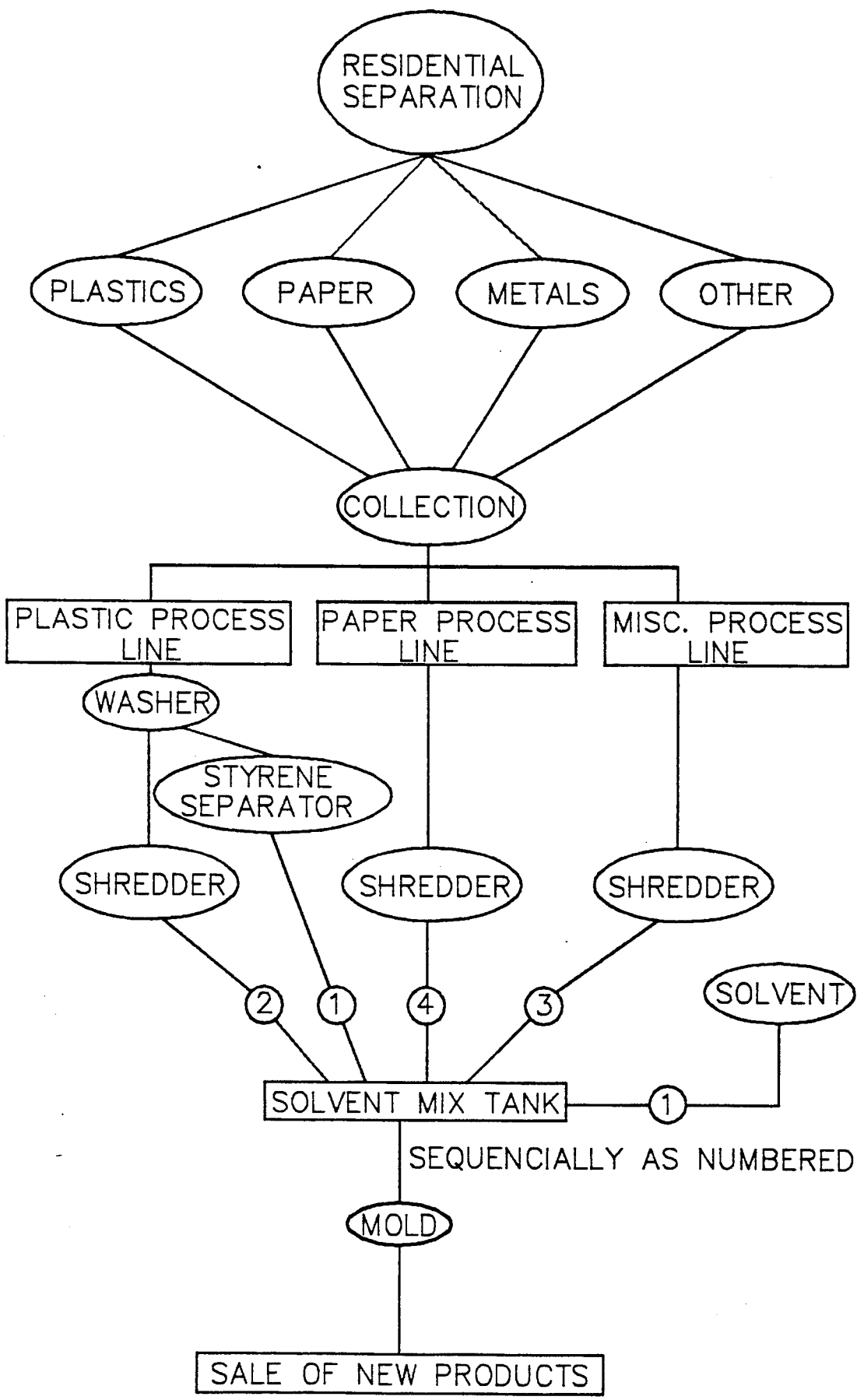

SOLVENT BASED PLASTICS RECYCLING PROCESS

BACKGROUND AND SUMMARY OF THE INVENTION

This invention relates generally to recycling processes and more particularly to an improved process for recycling plastic waste materials in which paper and other accompanying contaminant waste materials may be recycled together with the plastic waste materials. Plastic waste materials consume nearly thirty percent of the present landfill volume around the world. Many organizations have invested large amounts of money to develop various recycling processes that have not proven to be cost effective. These conventional plastics recycling efforts have typically involved very labor intensive, time consuming sorting of the plastic waste materials according to plastic species. In some cases, recycling has involved remixing of various plastic species to produce a particular product. All known processes for recycling plastic materials require heat molding, and they tolerate only very small amounts of contaminant materials. All of these prior art plastics recycling processes are more expensive than virgin material manufacturing techniques.

It is therefore a principal object of the present invention to provide an economical solvent based plastics recycling process that facilitates post consumer waste plastics recycling involving little or no sorting and that produces a wood or masonry substitute as an end product.

This and other objects are accomplished in accordance with the preferred embodiment of the present invention by providing a process that includes the steps separating polystyrene waste materials from other plastic waste materials, shredding the non-polystyrene plastic waste materials until a substance having a pulp-like consistency is obtained, spraying the separated polystyrene waste materials with a solvent in a solvent mix tank to reduce them to an epoxy type sludge, slowly adding the shredded non-polystyrene waste materials and mixing them with the epoxy type sludge, adding any desired shredded waste materials such as paper, cloth, rubber, crushed concrete, and metals, to obtain a liquid mass of reduced waste materials, removing the liquid mass of reduced waste materials from the solvent mix tank, removing the excess solvent from the liquid mass of reduced waste materials, molding or otherwise forming the resulting liquid mass of reduced waste materials to impart a desired form and texture, and curing or hardening the formed liquid mass of reduced waste materials to obtain a hardened end product.

BRIEF DESCRIPTION OF THE DRAWING

The drawing is a flow chart of a solvent based plastics recycling process in accordance with the present invention.

DETAILED DESCRIPTION OF THE INVENTION

Referring now to the appended drawing FIGURE, there is shown a flow chart of the plastics recycling process of the present invention. This process first involves, of course, collection of post consumer plastic waste materials. Preferably, all foamed polystyrene materials such as styrofoam are separated from the other plastic waste materials. The balance of comingled plastic waste materials is then shredded, using a commercially available granulator, until it becomes a fine pulp-like substance in consistency. The separated polystyrene materials are then dumped into a solvent mix tank and sprayed with a solvent, such as acetone, until the polystryene materials are reduced to an epoxy type sludge in which repolymerization of those materials occurs. Any of a variety of other solvents, such as ethyl acetate, may be employed in this process. However, acetone is a preferred solvent due to its low cost, ready availability, and low hazard risk during handling. Some stirring helps insure complete breakdown of the polystyrene materials. The shredded plastic materials are then slowly added and mixed with the sludge. Many other types of plastic materials are partially melted by the solvent. Other granulated materials, such as paper, cloth, rubber, metals, etc. may be added at this point in the process. Once other materials are added there is little time to mix and mold since some materials, like paper, will absorb the solvent and enhance the cure period. A minimum of 13% by volume of polystyrene is required to adequately coat the remaining materials.

At this point, the liquid mass of reduced plastic and other waste materials is then removed from the solvent mix tank. The excess solvent is removed from the sludge by mechanical separation, evaporation or draining. The resultant material is poured or injected into an appropriate mold and allowed to cure. A preferred mold material is polyethylene, due to its low cost and low adhesion characteristics with respect to the epoxy type sludge. The application of mild heat will enhance the curing process, although this step is not necessary. High heat applied during curing tends to melt plastic materials not reduced by the solvent and provides different end products and finishes. The end product, when cured, is a lumber or masonry type of plastic material that does not warp, split or warp. It may be easily cut with commercially available saws and may be nailed, screwed or glued with equal or greater holding strength than is exhibited by conventional wood and masonry products. Masonry substitute materials fabricated using the process of the present invention may be mortared or cemented together as easily as conventional masonry products. The end product of the instant process may also be employed in fabricating new plastic products with the same or improved properties as those of resulting from the use of virgin plastic materials.

Shredded paper, wood, cloth or even metals may be added in the solvent mix tank during the process of the present invention in order to produce a variety of textures and other physical properties, as well as to further reduce the landfill tonnage. The ability to form the end product of the present process by molding it into any desired shape makes it superior to conventional wood and masonry products. The addition and alignment of various fillers makes the end product of the present process directionally stronger and lighter than comparable wood, masonry or plastic products. The wide range of possible textures achieved by way of molding techniques is unlimited. In addition, color additives and fire retardants may be added prior to the molding step to provide a more marketable end product. Very little, if any, sorting or cleaning of the preshredded post consumer waste is required in the present process. Some cleaning may be desired when large amounts of food or chemical packaging material is expected. The present process becomes economically attractive because a higher percentage of impurities can be tolerated without affecting the stability of the end product. It has been found that the end product of the present recycling process also exhibits a high percentage of micron size air pockets that serve to provide a high thermal insulation factor that may be less than that of virgin polystyrene but that is equal to or greater than that of conventional wood products. Additionally, when pure polystyrene is reduced through the present process, very high adhesion characteristics are exhibited which makes the end product attractive for use as an inexpensive adhesive, such as a weatherproof coating for paper, cloth or wood products. No byproducts of the present process are known to exist other than the evaporated solvent and various gases produced through reduction.

The solvent based plastics recycling process of the present invention has been tested using 2.5 cu. ft. of assorted grade polystyrene scrap material. This material was exposed to approximately 6.0 oz. of acetone. The material was reduced to a volume of 0.008 cu. ft. and molded in an open cardboard box. The material was allowed to self cure. The box was cut away and the end product was examined. This sample took one week to cure and became very hard but did not crack or chip when nails and screws were driven into it. The material was rigid and light as would be a pine board of similar volume. The surface was much harder than that of oak, for example. An eight penny nail was driven into the material with no obvious chipping or splitting. The material had excellent grip characteristics. A force in excess of 110 pounds was required to remove the nail. A #10 wood screw was also driven into the material without predrilling and produced no evidence of chipping or cracking. Approximately 43 ft-lbs. of torque was required to break loose the screw. A 0.5" piece of material was sawed off one end of the material using a standard combination crosscut hand saw. The cut was no more difficult than cutting wood and was clean, without splitting or chipping. The initial observation of the cut area shows that the material is riddled with minute voids or air pockets. It is believed that these voids tend to improve both the fastener grip and insulation characteristics of the material.

A series of tests were performed with mixtures of shredded PVC and polystyrene. The ratios were varied from 25 percent to 75 percent of each by volume. The volumes tested each time filled four thirteen-ounce coffee cans. The shredded mixtures were reduced using less than eight ounces of acetone. The resultant sludge was poured into 4×4×8 inch polyethylene mold forms. The molded pieces were allowed to self cure with cure times varying from several hours to two days, with the longer times related to the higher percentages of polystyrene. Very little shrinkage was observed. All samples became harder and stronger than comparable wood products. All samples had smooth outer surfaces and were again riddled with micron size air pockets.

A series of tests were performed with mixtures of assorted plastics, paper, cloth, and metals. It was found that a minimum of 13 percent of polystyrene was required and that if paper was added, the self cure time was reduced to a few minutes, depending on the proportions of each material. Those materials unaffected by the solvent were coated and adhered to the reduced styrene. The end products tend to be very porous if no compression is provided during molding.

Mild heating of the molded samples will tend to speed the cure rates. High heating of the molded pieces to a temperature of approximately 300 degrees F. caused a partial refoaming on the exposed surface. If compression is applied to the molded material, higher density end products result.

A variety of mold materials were tested. Polished metals, such as steel, aluminum, and copper, were found to be so adhesive that they were destroyed in attempts to remove the surrounding material. This was true even when mold release agents were used and also when a teflon coated mold was used. Glass molds worked well, but Lexan molds worked as poorly as various metals.

I claim:

1. A process for recycling plastic waste materials, the process comprising the steps of:
   collecting plastic and other non-plastic waste materials;
   separating polystyrene plastic waste materials from other plastic waste materials collected;
   shredding the other plastic waste materials until a substance having a pulp-like consistency is obtained;
   spraying the separated polystyrene plastic waste materials with a single solvent in a solvent mix tank to reduce the volume of the separated polystyrene plastic waste materials and form a sludge;
   adding the shredded other plastic waste materials to the solvent mix tank and mixing them with the sludge contained therein to obtain a liquid mass of volume reduced waste materials;
   removing the liquid mass of volume reduced waste materials from the solvent mix tank;
   removing any excess solvent from the liquid mass of volume reduced waste materials;
   forming the liquid mass of volume reduced waste materials to impart a desired shape and texture thereto; and
   hardening the formed liquid mass of volume reduced waste materials to obtain an end product.

2. A process as in claim 1, further comprising the step of adding one or more types of the collected other non-plastic waste materials to the sludge contained in said solvent mix tank.

3. A process as in claim 2 wherein one of said one or more types of the collected other non-plastic waste materials comprises shredded paper.

4. A process as in claim 2 wherein one of said one or more types of the collected other non-plastic waste materials comprises shredded cloth.

5. A process as in claim 2 wherein one of said one or more types of the collected other non-plastic waste materials comprises shredded metal.

6. A process as in claim 2 wherein one of said one or more types of the collected other non-plastic waste materials comprises wood.

7. A process as in claim 2 wherein one of said one or more types of the collected other non-plastic waste materials comprises crushed concrete.

8. A process as in claim 1 wherein the step of hardening includes the application of heat to the formed liquid mass of reduced waste materials.

9. A process as in claim 1 wherein the step of forming the liquid mass of reduced waste materials includes the introduction of one or more additives.

10. A process as in claim 9 wherein one of said one or more additives comprises a coloring agent.

11. A process as in claim 9 wherein one of said one or more additives comprises a fire retardant.

12. A process as in claim 1 further comprising the step of cleaning the collected plastic and other non-plastic waste materials.

13. A process as in claim 1 further comprising the step of compressing the formed liquid mass of volume reduced waste materials.

14. A process as in claim 1 wherein said solvent comprises acetone.

15. A process as in claim 1 wherein said solvent comprises ethyl acetate.

* * * * *